April 6, 1954     F. D. SAWYER ET AL     2,674,079
COTTON STRIPPER
Filed Feb. 11, 1952
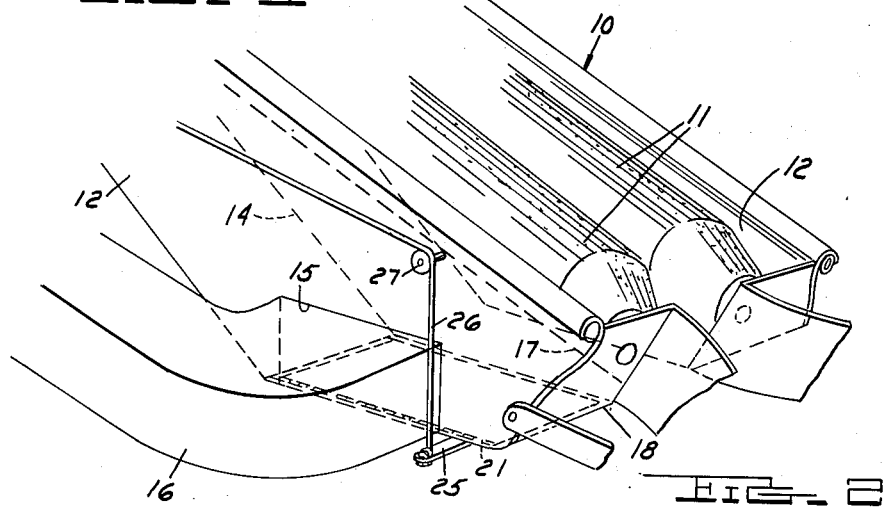
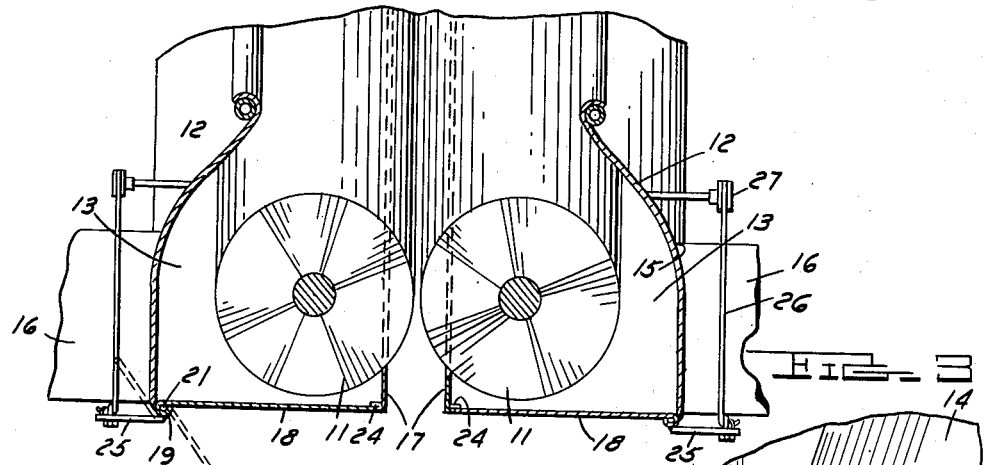
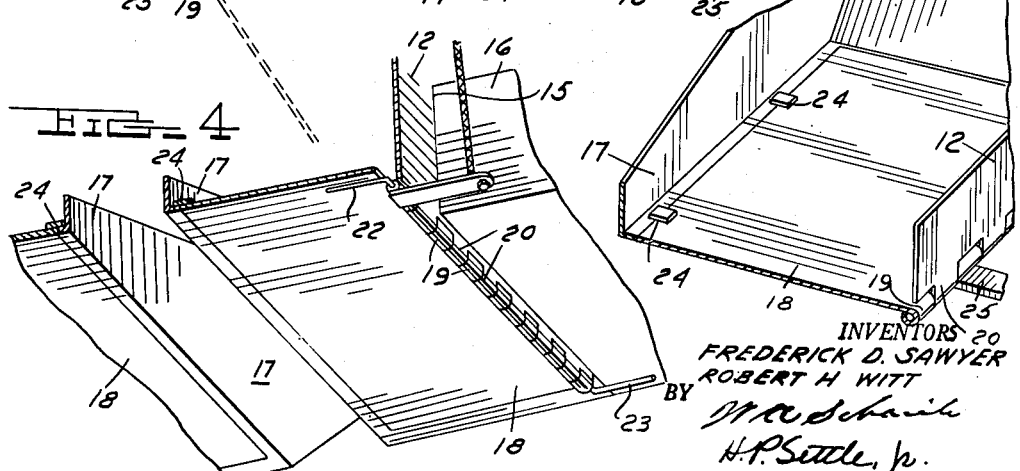
INVENTORS
FREDERICK D. SAWYER
ROBERT H. WITT
BY
ATTORNEYS Patented Apr. 6, 1954

2,674,079

UNITED STATES PATENT OFFICE 2,674,079

COTTON STRIPPER

Frederick D. Sawyer, Wayne, and Robert H. Witt, Royal Oak, Mich., assignors, by mesne assignments, to Ford Motor Company, Detroit, Mich., a corporation of Delaware Application February 11, 1952, Serial No. 270,995

4 Claims. (Cl. 56—30)

The present invention relates to a crop separation device and more particularly to a dumping means particularly adapted for use with a crop elevating mechanism operable to effect a density separation of relatively heavy material from a desired air-floatable crop.

In the pending applications of Robert H. Witt, Serial Numbers 240,565, now abandoned, and 240,566, filed August 6, 1951 and both assigned to the assignee of the present invention, there is disclosed a harvesting machine for air-floatable crops, such as cotton and the like. This harvesting machine comprises a tractor-mounted frame adapted to be elevated and lowered by a tractor driven hydraulic system and carrying a pair of counterrotatable stripping brushes effective to strip a crop from a plant interposed between the brushes. The stripped crop is centrifugally thrown from the brushes onto an inclined conveying surface for passage therealong to a suction pickup zone preferably located at the lower forward ends of the brushes. A pneumatic conveying system, including a fan, is provided to convey the cotton from the pickup zone to a rearwardly located receptacle, with the pickup being accomplished by venting the intake side of the fan to the pickup zone.

The present invention provides a novel means for removing undesired relatively heavy material from the pickup zone to obviate the possibility of this nonfloatable material clogging the pneumatic pickup area and/or other portions of the pneumatic conveying system. More particularly, one wall of the pickup zone, preferably the floor of the zone, is mounted for pivoting movement at the option of the machine operator for providing an escape port through which the undesired material is removed by gravity. The undesired material is relatively more dense than the air-floatable crop and may include unopened or green cotton bolls, stalks, stones, dirt and the like. Such undesired material may be broadly defined as "trash."

The specific adaptability of the present invention to the above described type of harvesting apparatus will be appreciated since the harvester is power liftable to a raised inoperative position at the end of a harvesting cycle, as at the end of a cotton row. Upon elevation of the harvester to facilitate the maneuvering of the apparatus for a turn, sufficient ground clearance is provided to accommodate dumping of the undesired material. Further, in the preferred embodiment of this invention, the entire floor wall of the pickup zone is pivoted for opening movement so as to facilitate the dumping of undesired material.

It is, therefore, an important object of the present invention to provide an improved crop separation device wherein undesired material is removable from a pneumatic pickup zone through a pivotally mounted zone wall.

Another important object is the provision of a harvesting machine for an air-floatable crop, the machine having a density separation zone wherein the crop is initially separated from trash and the like by reason of its floatability in an air stream with accumulated undesirable material being removable from the zone by actuation of a hinged door therefor.

It is a further object to provide a crop separation device for a power liftable harvesting apparatus and including a pivotally mounted floor actuatable upon elevation of the harvester for the gravity removal of relatively dense material on the floor.

The specific nature of this invention, as well as other objects and advantages thereof, will become apparent to those skilled in the art from the following detailed description, taken in conjunction with the one sheet of drawings on which, by way of preferred example, only, is illustrated one embodiment of this invention.

On the drawings:

Figure 1 is a fragmentary perspective view of a harvesting machine provided with a crop separating device of the present invention;

Figure 2 is an enlarged front elevational view with parts broken away and shown in section of the apparatus of Figure 1;

Figure 3 is a fragmentary perspective view with parts broken away and shown in section further illustrating the apparatus of Figures 1 and 2; and Figure 4 is a perspective view of the bottom of the door and associated parts with a portion thereof broken away and shown in section.

As shown on the drawings:

In Figure 1 reference numeral 10 refers generally to a harvesting machine generally similar to that described and claimed in the said pending applications of Robert H. Witt, Serial Numbers 240,565 now abandoned and 240,566. The machine generally includes a pair of counterrotatable, generally cylindrical stripping brushes 11 located forwardly of the machine and inclined upwardly and rearwardly therefrom. The brushes are journaled in flare sheets 12 formed of sheet metal and partially enclosing the brushes 11.

The flare sheets 12 at their forward lower ends each define an interior pickup area 13 located outwardly and beneath the brushes. The areas 13 are in full communication with the brushes, so that a crop stripped from the brushes is peripherally conveyed by the brushes and centrifugally flung therefrom into the areas 13. The areas 13 also receive cotton flung from the brushes 11 upwardly and rearwardly beyond the areas, since this cotton will slide downwardly to the areas 13 on conveying surfaces 14 closely underlying the brushes.

The exterior side walls of each of the flare sheets 12 is apertured, as at 15, for communication with outwardly and rearwardly extending suction conduit 16 vented to the intake side of a pneumatic blower or fan (not shown but fully described in the above identified Witt application). The areas 13 thus serve as a pickup area from which the stripped, air-floatable crop is withdrawn by the pneumatic conveying system through the pickup conduits 16.

The areas 13, as hereinbefore described, are partially enclosed by the flare sheets 12, while the brushes 11 define the inner walls of the areas. In addition, each brush has mounted therebeneath, an upturned rearwardly extending lip 17 which cooperates with the associated brush to prevent the carrying of the stripped crop into the area intermediate the brushes and which also serves as a deflector for retaining the crop within the areas 13.

The floor of each of the areas 13 is defined by a sheet metal door 18 bridging the gap between the exterior flare sheets 12 and the interior lips 17. The outer edge of the door 18 is provided with inturned re-entrant portions 19 which cooperate with similar portions 20 at the lower extremities of the flare sheets 12 to define interleaved hinge leaves receiving therethrough an elongated pintle 21. The pintle 21 is formed of an inherently resilient, relatively small diameter wire having one end portion laterally displaced, as at 22, to lie against the undersurface of the floor 18 and at the other end oppositely displaced, as at 23, to lie underneath the adjacent undersurface of the conduit 16. The lips 17 each carry spaced transversely extending, inwardly projecting stops 24 against the undersurface of which the upper surface of the bottom 18 abuts.

Thus it will be seen that the bottom walls 18 of the areas 13 are pivotally mounted upon the flare sheets and are biased to closed positions by the spring pintles 21. In addition, the stops 24 prevent displacement of the bottom walls into the spaces 13 under the influence of the springs 21.

The bottom walls 18 are adapted to be actuated from their closed positions against the force of the spring pintle 21 by operator-actuated means including a lever 25 secured to each of the bottom walls and projecting laterally outwardly therebeyond for connection to flexible actuating elements, such as a cable or rope 26, trained about a pulley 27 carried by the flare sheet, the element 26 extending rearwardly therebeyond to a position to be actuated by suitable means.

During operation of the harvester, the forward ends of the brush elements are very closely spaced with respect to the ground so that all of the crop may be stripped from the growing plants. When the harvester is thus operated, the bottom walls 18 remain closed under the influence of the spring pintle 21. The crop, together with undesirable material, such as green bolls, stalks, stones and dirt, etc., is introduced into the area 13 from the brushes, and the air-floatable material within the areas 13 is removed therefrom by the aspirating effect of the conveyor blower. The relatively heavier, non-floatable material will remain within the areas 13 and, if this material is not removed, the accumulation of the same may cause partial or complete clogging of the suction intake apertures 15. Upon the completion of a harvesting cycle, as upon reaching the end of a crop row, the harvester is elevated to facilitate turning of the same for a subsequent operating cycle, and the bottom walls 18 are spaced sufficiently from the ground for the same to be opened to their dotted positions illustrated in Figure 2. This opening of the walls is accomplished through the actuating elements 26 and the levers 25, with the elements 26 preferably being manually operated by the machine operator. Due to gravity, the heavier materials will slide down the opened bottom walls to the ground and upon release of the elements 26, the spring pintles 21 will again bias the bottom walls to their closed positions.

Thus it will be seen that the present invention provides a simple but effective means for the removal of non-floatable material from a harvesting machine for the harvesting of air floatable crops. The operation of the removal means may be readily correlated with the operation of the harvesting machine, so that no loss of time or operating efficiency is caused.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a harvesting machine having a harvesting head journaling a pair of crop-stripping elements and a pneumatic conveying system for removing a harvested crop from said head, the improvements which comprise means defining an open-bottomed crop-collecting area located immediately adjacent said stripping elements and receiving said crop therefrom, a pivotable floor section closing the open bottom of said area, and means for actuating said floor section to open the same, whereby said area may be emptied of trash stripped by said elements.

2. In a harvesting machine having a flare sheet enclosing harvesting elements and partially enclosing an area to which a crop harvested by said elements falls by gravity for later aspiration by a pneumatic conveying system effecting a specific gravity separation of the crop and associated trash, the improvements which comprise a door defining a floor for said area and cooperating with said flare sheet to further enclose said crop and trash, means pivotally mounting said door on said flare sheet for movement to and from a closed position, and spring means normally biasing said door to its said closed position.

3. In a harvesting machine having a pair of cooperating stripping elements and a pneumatic conveying system for conveying a stripped crop from said elements, a crop separation device comprising a flare sheet partially enclosing the stripping elements to partially define a crop-receiving space vented to said conveying system, a floor plate hinged to said flare sheet to further define said space and to receive thereon material stripped by said elements, and means for opening said floor plate to gravitationally dump material from said space.

4. In combination with a harvesting machine having a power liftable harvesting head provided with a flare sheet enclosing a crop-stripping element, said head being power liftable from a lowered position at which said flare sheet is closely spaced from the ground to an elevated position at which said flare sheet is raised substantially from the ground, and a pneumatic conveying system, the improvements which comprise a dispensing door hingedly connected to said flare sheet and cooperable therewith to define the floor of an interior space adapted to receive a crop stripped by said element and vented to the intake side of said system, resilient means normally biasing said door to closed position, and means for opening said door against the action of said resilient means, said resilient means normally retaining said door closed when said head is in its lowered position to avoid interference of the door with the ground, and said door being of such size as not to interfere with the ground upon opening the door with the head in raised position.

References Cited in the file of this patent

UNITED STATES PATENTS

| Number | Name | Date |
|---|---|---|
| 1,722,747 | Hentz | July 30, 1929 |
| 1,959,070 | Thomann | May 15, 1934 |
| 2,004,713 | Thomann | June 11, 1935 |